(12) United States Patent
Shtekelmacher et al.

(10) Patent No.: US 8,881,759 B1
(45) Date of Patent: Nov. 11, 2014

(54) MANUAL SELECTOR FOR HYDRAULIC CONTROL VALVE

(71) Applicant: Galcon Bakarim Agricultural Cooperative Society Ltd., Kfar Blum (IL)

(72) Inventors: Shay Shtekelmacher, Kfer Korazim (IL); Sari Razili, Kibbutz Kfar Blum (IL)

(73) Assignee: Galcon Bakarim Agricultural Cooperative Society Ltd., Kfar Blum (IL)

(*) Notice: Subject to any disclaimer, the term of this patent is extended or adjusted under 35 U.S.C. 154(b) by 0 days.

(21) Appl. No.: 14/044,012

(22) Filed: Oct. 2, 2013

(51) Int. Cl.
*F16K 31/128* (2006.01)
*F16K 31/365* (2006.01)
*F16K 31/40* (2006.01)
*F16K 35/02* (2006.01)

(52) U.S. Cl.
CPC .................................. *F16K 35/025* (2013.01)
USPC .................. 137/489; 251/129.03; 251/30.02; 251/30.04

(58) Field of Classification Search
USPC ............ 251/18, 29, 19, 129.03, 30.02, 30.04; 137/489, 553
See application file for complete search history.

(56) References Cited

U.S. PATENT DOCUMENTS

| | | | | |
|---|---|---|---|---|
| 2,388,868 | A * | 11/1945 | Ray ............................... | 137/495 |
| 3,500,844 | A | 3/1970 | Sanner | |
| 3,829,059 | A * | 8/1974 | Rupert ........................... | 251/26 |
| 3,865,138 | A | 2/1975 | Jones | |
| 4,603,832 | A * | 8/1986 | Sjoquist ..................... | 251/30.02 |
| 4,624,441 | A * | 11/1986 | Kreitchman et al. ...... | 251/30.01 |
| 5,404,902 | A * | 4/1995 | Wen ............................... | 137/489 |
| 6,394,412 | B2 * | 5/2002 | Zakai et al. ................. | 251/30.02 |
| 6,557,580 | B2 * | 5/2003 | Lohde et al. ............. | 137/315.01 |
| 8,505,566 | B2 * | 8/2013 | Nguyen ..................... | 137/15.09 |
| 8,584,701 | B2 * | 11/2013 | Duncan .......................... | 137/555 |

* cited by examiner

*Primary Examiner* — Craig Schneider
*Assistant Examiner* — Atif Chaudry
(74) *Attorney, Agent, or Firm* — The Law Office of Michael E. Kondoudis

(57) ABSTRACT

A selector with at least two settings, useful for controlling flow of fluid in a hydraulic control valve. In at least one of the settings of the selector, control of fluid flow is fully automatic, being controlled by the valve actuator, and in at least one of the settings of the selector, control of fluid flow is fully manual, being entirely independent of the valve actuator.

17 Claims, 7 Drawing Sheets

MANUAL SELECTOR FOR HYDRAULIC CONTROL VALVE

FIELD OF THE INVENTION

The present invention generally pertains to a system and method for controlling flow of water in a watering system, with the flow normally controlled automatically but where the flow of water can be stopped manually in a rapid and efficient manner.

BACKGROUND OF THE INVENTION

Hydraulic control valves are commonly used in control of liquid flow, especially in watering systems such as sprinkler and dripper systems for watering lawns, for irrigation and the like. Such valves are commonly controlled by a solenoid; the movable plunger of the solenoid (the actuator), in the closed position, stops the flow of liquid by blocking the liquid flow, usually by closing a nozzle gate lock in the control flow path, and, in the open position, the solenoid allows liquid flow by removing the plunger from its blocking position.

Manual shutoff is a desirable feature for such valves. An example of the desirability of a manual shutoff is the situation where a valve has a leak or a problem has occurred in the water system but repair or replacement of the valve or repair of the problem in the water system must be delayed until a part or parts is available or the maintenance is completed. In order to avoid waste of water, it is desirable to shut the valve or valves off completely; no water should flow through the valve even if the automatic control is in the unblocking condition.

However, existing hydraulic control valves often only provide "fully automatic" or "manual off/on" operation; the valve can be turned on and off automatically and it can be turned off or on manually if the plunger is in blocking position, but when the plunger is in the unblocking position, putting the manual control in the shutoff position returns the device to automatic operation; there is no "manual off" setting in which automatic control is ignored so that no water flows even if the automatic control is in the unblocking position.

U.S. Pat. No. 3,500,844 discloses a lawn sprinkling system or the like including at least one solenoid actuated flow valve for controlling the flow of water to a sprinkling device, timer mechanism for regulating the operation of said valve and the flow of water there through, and an override arrangement for effecting the closing of said valve during periods of actual rainfall and for automatically restoring the operation of the valve to the control of the timer mechanism when the rainfall ceases. However, this system lacks a "manual on" feature, as described above.

U.S. Pat. No. 3,865,138 discloses a device having an inlet and an outlet and adapted to be connected directly to an outdoor water faucet by the inlet and be self-supporting thereby, and including an electrically controlled solenoid valve interposed between the inlet and outlet to control water flow there through, the solenoid valve being connected to an electrically operated timer and to a source of electrical power for the timed operation of the solenoid valve, and with there being a pair of key operated switches associated with the timer and solenoid valve for selecting either manual or automatic operation of the solenoid valve along with selectively de-energizing the solenoid valve during a timed operation cycle without having to wait for the timed cycle to end. However this system lacks a "manual on" feature, as described above.

It is therefore a long felt need to provide an automatic valve for controlling water flow that includes fully manual control.

SUMMARY OF THE INVENTION

It is an object of the present invention to disclose a system for and method for controlling flow of liquid, where the flow is normally controlled automatically but where the flow of water can be stopped manually in a rapid and efficient manner and where the flow can be continuous, independent of the setting of the automatic control.

It is another object of the present invention to disclose a selector (500) useful for controlling flow of fluid in a hydraulic control valve (1000), said flow of fluid controllable by an actuator (200) comprising a plunger (210), said actuator (200) having at least two states, a first state with said plunger (210) in a blocking position preventing flow of fluid past the tip of said plunger (210), and a second state with said plunger (210) in an unblocking position permitting flow of fluid past the tip of said plunger (210), said selector (500) comprising:

a. a bore (540) characterized by a nozzle gate (542), said bore (540) blockable at said nozzle gate (542) by said plunger (210); and b. a manual control means (550) adapted to reversibly transition said selector (500) between at least two positions, a first at least one position (1030), and a second at least one position (1040, 1050) in which fluid flow bypasses said plunger (210) tip, enabling manual control of said fluid flow, wherein said hydraulic control valve (1000) is adapted to provide, in said at least one first position, fully-automatic control (1030) by enabling fluid flow past said tip of said plunger (210) so that said states of said actuator (200) control fluid flow and, in said at least one second position, fully-manual control of water flow by either (a) blocking fluid flow through said selector (1050), thereby preventing fluid flow through said hydraulic control valve (1000) or (b) providing a fluid connection through said selector (1040) wherein fluid flow is via a fluid connection (520, 525) bypassing said nozzle gate (542) of said bore (540), thereby enabling fluid flow through said hydraulic control valve (1000) independent of the position of said plunger (210).

It is another object of the present invention to disclose the selector (500), wherein said position (1050) in which fluid flow through said selector is blocked is an always-off position.

It is another object of the present invention to disclose the selector (500), wherein said position (1040) in which fluid flow is via a fluid connection (520, 525) bypassing said nozzle gate (542) of said bore (540) is an always-on position.

It is another object of the present invention to disclose the selector (500), wherein said manual control means (550) is selected from a group consisting of a lever, a knob, a button, a slider, and any combination thereof.

It is another object of the present invention to disclose the selector (500), wherein said bore (540) is characterized by a main longitudinal axis.

It is another object of the present invention to disclose the selector (500), wherein said manual control means (550) is adapted to rotate said selector (500) about said bore (540) main longitudinal axis.

It is another object of the present invention to disclose the selector (500), wherein said selector (500) is adapted for outside-in flow.

It is another object of the present invention to disclose the selector (500), additionally comprising at least one check mechanism, said check mechanism adapted to provide a positive indication that said selector is properly aligned to at least one of said at least one first position and said at least one second position.

It is another object of the present invention to disclose the selector (500), wherein said check mechanism is selected from a group consisting of: a stop, a detent, a catch, a pawl, a dog, a pin, a stud, a lever, and any combination thereof.

It is another object of the present invention to disclose the selector (500), wherein said hydraulic control valve (1000) is adapted to control flow of a liquid selected from a group consisting of water, oil, alcohol, milk, juice, tea, coffee and any combination thereof.

It is another object of the present invention to disclose, in a hydraulic control valve (1000) controllable by an actuator (200), a selector (500);
with said hydraulic control valve (1000) characterized by:
a. an off configuration (1020) such that the fluid connection (220) is blocked between the diaphragm space (650) of said hydraulic control valve (1000) and the outlet (420) of said hydraulic control valve (1000) so that water pressure behind said diaphragm (600) seals said diaphragm (600) against the barrier (450) between inlet (410) and outlet (420), preventing water flow from said inlet to said outlet; and
b. an on configuration (1010) such that there exists a fluid connection (220) between said diaphragm space (650) of said hydraulic control valve (1000) and said outlet (420) of said hydraulic control valve (1000), said fluid connection (220) enabling water to escape from behind said diaphragm (300) so that said diaphragm (600) unseals from said barrier (450) and water flows from said inlet (410) to said outlet (420);
and with said selector (500) adapted to reversibly configure into at least three positions:
a. an always-off position (1050) wherein said selector (500) blocks (530) fluid connection between said diaphragm space (650) and said outlet (420) so that said hydraulic control valve (1000) is in said off configuration independent of said actuator (200);
b. an always-on position (1040) wherein said selector (500) provides a fluid connection (520, 525) between said diaphragm space (650) and said outlet (420), said fluid connection (525) bypassing said actuator (200) so that said hydraulic control valve (1000) is in said on configuration independent of said actuator (200); and
c. an automatic-control position (1030) wherein said selector (500) provides a fluid connection (510, 530) between said diaphragm space (650) and said outlet (420) via said actuator (200) so that said actuator (200) controls whether said hydraulic control valve (1000) is in said off configuration or said on configuration.

It is another object of the present invention to disclose the selector, additionally comprising a manual control means adapted to enable said selector to reversibly configure into a member selected from a group consisting of said always-off position (1050), said automatic position (1030), and said always-on position (1040).

It is another object of the present invention to disclose the selector, wherein said manual control means (550) is selected from a group consisting of a lever, a knob, a button, a slider, and any combination thereof.

It is another object of the present invention to disclose the selector, wherein said bore (540) is characterized by a main longitudinal axis.

It is another object of the present invention to disclose the selector, wherein said manual control means (550) is adapted to rotate said main section (560) about said bore (540) main longitudinal axis.

It is another object of the present invention to disclose the selector, wherein said selector (500) is adapted for outside-in flow.

It is another object of the present invention to disclose the selector, additionally comprising at least one check mechanism, said check mechanism adapted to provide a positive indication that said selector is properly aligned to at least one of said at least one first position and said at least one second position.

It is another object of the present invention to disclose the selector, wherein said check mechanism is selected from a group consisting of: a stop, a detent, a catch, a pawl, a dog, a pin, a stud, a lever, and any combination thereof.

It is another object of the present invention to disclose the selector, wherein said hydraulic control valve (1000) is adapted to control flow of a liquid selected from a group consisting of water, oil, alcohol, milk, juice, tea, coffee and any combination thereof.

It is another object of the present invention to disclose, in a hydraulic control valve (1000) controllable by an actuator (200), a selector (500) adapted to reversibly configure into at least three positions:
a. an always-off position (1050) wherein said selector (500) blocks (530) fluid connection between a diaphragm space (650) of said hydraulic control valve (1000) and the outlet (420) of said hydraulic control valve (1000) so that water pressure behind said diaphragm (600) seals said diaphragm (600) against a barrier (450) between inlet (410) and outlet (420), preventing water flow from said inlet (410) to said outlet (420);
b. an always-on position (1040) such that there exists a fluid connection between said diaphragm space (650) of said hydraulic control valve (1000) and said outlet (420) of said hydraulic control valve (1000), said fluid connection enabling water to escape from behind said diaphragm (600) so that said diaphragm (600) unseals from said barrier and water flows from said inlet (410) to said outlet (420), said fluid connection bypassing said actuator (200) so that said liquid flow is independent of said actuator (200); and
c. an automatic-control position (1030) wherein said fluid connection between said diaphragm space (650) of said hydraulic control valve (1000) and said outlet (420) of said hydraulic control valve (1000) is via said actuator (200), such that, if said actuator (200) is in its closed state, the fluid connection is blocked between the diaphragm space (650) of said hydraulic control valve (1000) and the outlet (420) of said hydraulic control valve (1000) so that water pressure behind said diaphragm (600) seals said diaphragm (600) against a barrier (450) between inlet (410) and outlet (420), preventing water flow from said inlet (410) to said outlet (420) and if said actuator (200) is in its open state there is a fluid connection enabling water to escape from behind said diaphragm (600) so that said diaphragm (600) unseals from said barrier (450) and water flows from said inlet (410) to said outlet (420).

It is another object of the present invention to disclose the selector, additionally comprising a manual control means adapted to enable said selector to reversibly configure into a member selected from a group consisting of said always-off position (1050), said automatic position (1030), and said always-on position (1040).

It is another object of the present invention to disclose the selector, wherein said manual control means (550) is selected from a group consisting of a lever, a knob, a button, a slider, and any combination thereof.

It is another object of the present invention to disclose the selector, wherein said bore (540) is characterized by a main longitudinal axis.

It is another object of the present invention to disclose the selector, wherein said manual control means (550) is adapted to rotate said main section (560) about said bore (540) main longitudinal axis.

It is another object of the present invention to disclose the selector, wherein said selector (500) is adapted for outside-in flow.

It is another object of the present invention to disclose the selector, additionally comprising at least one check mechanism, said check mechanism adapted to provide a positive indication that said selector is properly aligned to at least one of said at least one first position and said at least one second position.

It is another object of the present invention to disclose the selector, wherein said check mechanism is selected from a group consisting of: a stop, a detent, a catch, a pawl, a dog, a pin, a stud, a lever, and any combination thereof.

It is another object of the present invention to disclose the selector, wherein said hydraulic control valve (1000) is adapted to control flow of a liquid selected from a group consisting of water, oil, alcohol, milk, juice, tea, coffee and any combination thereof.

It is another object of the present invention to disclose a selector (500) for a hydraulic control valve (1000), said hydraulic control valve (1000) automatically controllable by an actuator (200) comprising a plunger (210), said actuator (200) having a first state with said plunger (210) in a blocking position preventing flow of fluid past the tip of said plunger (210), and a second state with said plunger (210) in an unblocking position permitting flow of fluid past the tip of said plunger (210), said hydraulic control valve (1000) characterized by
a body (400);
an inlet (410);
an outlet (420);
a barrier (450) partially blocking liquid flow between said inlet (410) and said outlet (420); and
a diaphragm (600) separated from said body (400) by a diaphragm space (650); said diaphragm (600) having at least one diaphragm hole (610) fluidly connecting said inlet and said diaphragm space; and said body (400) having a wall hole (430) such that said diaphragm space (650) is fluidly connectable via said selector (500) to said outlet (420); said diaphragm (600) having at least two positions, a sealed position wherein said diaphragm (600) seals against said barrier (450) and prevents liquid flow from said inlet (410) to said outlet (420) and an unsealed position wherein there is a gap between said diaphragm (600) and said barrier (450), such that said inlet (410) is fluidly connected to said outlet (420) via said gap; and said diaphragm (600) being in said sealed position at such times as liquid flow is prevented between said diaphragm space (650) and said outlet (420); and said diaphragm (600) being in said unsealed position at such times as there exists liquid flow between said diaphragm space (650) and said outlet (420);
said selector (500) comprising:
a. a main section (560) fitting snugly and rotatably into said hydraulic control valve (1000), said main section (560) comprising:

i. a central bore (540) comprising, at its upstream end, a nozzle gate (542) and, at its downstream end, an exit nozzle (544), said central bore (540) adapted to be reversibly sealable at said nozzle gate (542) by said plunger (210), said central bore (540) fluidly connected at said exit nozzle (544) to said outlet (420);
 ii. a well (530) at least partly surrounding said central bore (540), said well (530) fluidly connected to said nozzle gate (542);
 iii. a first aperture (510) adapted to fluidly connect said wall hole (430) to said well (530); and
 iv. a second aperture (520) adapted to fluidly connect said wall hole (430) to a side of said bore (540), said second aperture (520) fluidly connected to said well only via said nozzle gate (542), said first aperture (510) being blocked by said hydraulic control valve (1000) wall at such times as said second aperture (520) is fluidly connected to said wall hole (430) and said second aperture (510) being blocked by said hydraulic control valve (1000) wall at such times as said first aperture (520) is fluidly connected to said wall hole (430); and
b. a manual control means (550) connected to said main section (560), said manual control means (550) adapted to enable said main section (560) to reversibly configure into at least three positions, an automatic position (1030) such that said first aperture (510) is fluidly connected to said wall hole (430), an always-on position (1040) such that said second aperture (520) is fluidly connected to said wall hole (430), and an always-off position (1050) such that fluid connection to said wall hole (430) is blocked;
wherein, at such times as said selector (500) is in said automatic position (1030), said diaphragm space (650) is fluidly connected to said outlet (420) via said nozzle gate (542) so that liquid flow is controllable by the state of said actuator (200);
further wherein, at such times as said selector (500) is in said always-on position (1040), said diaphragm space (650) is fluidly connected to said outlet (420) via said second aperture (520) and said side of said central bore (540) so that liquid flow is independent of the state of said actuator (200);
and further wherein, at such times as said manual control is in said always-off position (1050), fluid connection is blocked between said diaphragm space (650) and said central bore (540), thereby preventing liquid flow from said inlet (410) to said outlet (420).

It is another object of the present invention to disclose the selector, additionally comprising a manual control means adapted to enable said selector to reversibly configure into a member selected from a group consisting of said always-off position (1050), said automatic position (1030), and said always-on position (1040).

It is another object of the present invention to disclose the selector, wherein said manual control means (550) is selected from a group consisting of a lever, a knob, a button, a slider, and any combination thereof.

It is another object of the present invention to disclose the selector, wherein said bore (540) is characterized by a main longitudinal axis.

It is another object of the present invention to disclose the selector, wherein said manual control means (550) is adapted to rotate said main section (560) about said bore (540) main longitudinal axis.

It is another object of the present invention to disclose the selector, wherein said selector (500) is adapted for outside-in flow.

It is another object of the present invention to disclose the selector, additionally comprising at least one check mechanism, said check mechanism adapted to provide a positive indication that said selector is properly aligned to at least one of said at least one first position and said at least one second position.

It is another object of the present invention to disclose the selector, wherein said check mechanism is selected from a group consisting of: a stop, a detent, a catch, a pawl, a dog, a pin, a stud, a lever, and any combination thereof.

It is another object of the present invention to disclose the selector, wherein said hydraulic control valve (1000) is adapted to control flow of a liquid selected from a group consisting of water, oil, alcohol, milk, juice, tea, coffee and any combination thereof.

It is another object of the present invention to disclose a method for providing control of flow of fluid in a hydraulic control valve (1000), said flow of fluid controllable by an actuator (200) comprising a plunger (210), said actuator (200) having at least two states, a first state with said plunger (210) in a blocking position preventing flow of fluid past the tip of said plunger (210), and a second state with said plunger (210) in an unblocking position permitting flow of fluid past the tip of said plunger (210), said method comprising steps of:
a. providing said hydraulic control valve (1000);
b. providing a selector (500) useful for controlling flow of fluid in said hydraulic control valve (1000), comprising:
 i. a bore (540) characterized by a nozzle gate (542), said nozzle gate (542) blockable by said plunger (210); and
 ii. a manual control means (550) adapted to reversibly transition said selector (500) between at least two positions, a first at least one position (1030), and a second at least one position (1040, 1050) in which fluid flow bypasses said plunger (210) tip, enabling manual control of said fluid flow;
c. emplacing said selector (500) in said hydraulic control valve (1000); and
d. positioning said manual control means (550) in a position selected from a group consisting of said at least one first position and said at least one second position thereby,
in said at least one first position, controlling said fluid flow in a fully-automatic manner by enabling fluid flow past said tip of said plunger (210) so that said states of said actuator (200) control fluid flow
and, in said at least one second position, controlling said fluid flow in a fully-manual manner by either (a) blocking fluid flow through said selector (1050), thereby preventing fluid flow through said hydraulic control valve (1000) or (b) providing a fluid connection through said selector (1040) wherein fluid flow is via a fluid connection (520, 525) bypassing said nozzle gate (542) of said bore (540), thereby enabling fluid flow through said hydraulic control valve (1000) independent of the state of said actuator (200).

It is another object of the present invention to disclose the method, additionally comprising steps of providing an always-off position, said always-off position being said position (1050) wherein fluid flow through said selector is blocked.

It is another object of the present invention to disclose the method, additionally comprising steps of providing an always-on position, said always-on position being said position (1040) wherein fluid flow is via a fluid connection (520, 525) bypassing said nozzle gate (542) of said bore (540).

It is another object of the present invention to disclose the method, additionally comprising steps of selecting said manual control means (550) from a group consisting of a lever, a knob, a button, a slider, and any combination thereof.

It is another object of the present invention to disclose the method, additionally comprising steps of characterizing said bore (540) by a main longitudinal axis.

It is another object of the present invention to disclose the method, comprising steps of rotating said manual control means (550) about said bore (540) main longitudinal axis.

It is another object of the present invention to disclose the method, additionally comprising steps of providing said selector (500) adapted for outside-in flow.

It is another object of the present invention to disclose the method, additionally comprising at least one check mechanism, said check mechanism adapted to provide a positive indication that said selector is properly aligned to at least one of said at least one first position and said at least one second position.

It is another object of the present invention to disclose the method, wherein said check mechanism is selected from a group consisting of: a stop, a detent, a catch, a pawl, a dog, a pin, a stud, a lever, and any combination thereof.

It is another object of the present invention to disclose the method, additionally comprising steps of controlling flow of a liquid selected from a group consisting of water, oil, alcohol, milk, juice, tea, coffee and any combination thereof.

It is another object of the present invention to disclose a method for mechanically controlling flow in a hydraulic control valve (1000), said hydraulic control valve (1000) automatically controllable by an actuator (200), said method comprising steps of:
a. providing a selector (500) adapted to reversibly configure into three positions:
 i. an always-off position (1050) wherein said selector (500) blocks (530) fluid connection between said diaphragm space (650) and said outlet (420), thereby ensuring said hydraulic control valve (1000) is in said off configuration independent of said actuator (200);
 ii. an always-on position (1040) wherein said selector (500) provides a fluid connection (520, 525) between said diaphragm space (650) and said outlet (420), thereby bypassing said actuator (200) and ensuring that said hydraulic control valve (1000) is in said on configuration independent of said actuator (200); and
 iii. an automatic-control position (1030) wherein said selector (500) provides a fluid connection (510, 530) between said diaphragm space (650) and said outlet (420) via said actuator (200), thereby ensuring that said actuator (200) controls whether said hydraulic control valve (1000) is in said off configuration or said on configuration;
b. providing a hydraulic control valve (1000) adapted to contain said selector (500) snugly and rotatably, said hydraulic control valve (1000) characterized by:
 i. an off configuration (1020) such that the fluid connection (220) is blocked between the diaphragm space (650) of said hydraulic control valve (1000) and the outlet (420) of said hydraulic control valve (1000) so that water pressure behind said diaphragm (600) seals said diaphragm (600) against the barrier (450) between inlet (410) and outlet (420), preventing water flow from said inlet to said outlet; and
 ii. an on configuration (1010) such that there exists a fluid connection (220) between said diaphragm space (650) of said hydraulic control valve (1000) and said outlet (420) of said hydraulic control valve (1000), said fluid connection (220) enabling water to escape from behind said diaphragm (300) so that said diaphragm (600) unseals from said barrier (450) and water flows from said inlet (410) to said outlet (420);

c. seating said selector (500) snugly and rotatably in said hydraulic control valve (1000);
d. connecting said hydraulic control valve (1000) to a source of liquid;
e. connecting said solenoid (210) to at least one of said hydraulic control valve (1000) and said selector (500);
f. reversibly positioning said selector (500) in at least one of said three positions.

It is another object of the present invention to disclose the method, additionally comprising steps of providing a manual control means adapted to enable said selector to reversibly configure into a member selected from a group consisting of said always-off position (1050), said automatic position (1030), and said always-on position (1040).

It is another object of the present invention to disclose the method, additionally comprising steps of selecting said manual control means (550) from a group consisting of a lever, a knob, a button, a slider, and any combination thereof.

It is another object of the present invention to disclose the method, additionally comprising steps of characterizing said bore (540) by a main longitudinal axis.

It is another object of the present invention to disclose the method, additionally comprising steps of rotating said main section (560) about said bore (540) main longitudinal axis by use of said manual control means (550).

It is another object of the present invention to disclose the method, additionally comprising steps of adapting said selector (500) for outside-in flow.

It is another object of the present invention to disclose the method, additionally comprising at least one check mechanism, said check mechanism adapted to provide a positive indication that said selector is properly aligned to at least one of said at least one first position and said at least one second position.

It is another object of the present invention to disclose the method, wherein said check mechanism is selected from a group consisting of: a stop, a detent, a catch, a pawl, a dog, a pin, a stud, a lever, and any combination thereof.

It is another object of the present invention to disclose the method, additionally comprising steps of controlling flow of a liquid selected from a group consisting of water, oil, alcohol, milk, juice, tea, coffee and any combination thereof.

It is another object of the present invention to disclose a method for mechanically controlling flow in a hydraulic control valve (1000) controllable by an actuator (200), comprising steps of:
a. providing a selector (500) adapted to configure into three positions:
  i. an always-off position (1050) wherein said selector (500) blocks (530) fluid connection between a diaphragm space (650) of said hydraulic control valve (1000) and the outlet (420) of said hydraulic control valve (1000) so that water pressure behind said diaphragm (600) seals said diaphragm (600) against a barrier (450) between inlet (410) and outlet (420), thereby preventing water flow from said inlet (410) to said outlet (420),
  ii. an always-on position (1040) such that there exists a fluid connection between said diaphragm space (650) of said hydraulic control valve (1000) and said outlet (420) of said hydraulic control valve (1000), said fluid connection enabling water to escape from behind said diaphragm (600) so that said diaphragm (600) unseals from said barrier and water flows from said inlet (410) to said outlet (420), thereby bypassing said actuator (200) and providing said liquid flow independent of said actuator (200); and
  iii. an automatic-control position (1030) wherein said fluid connection between said diaphragm space (650) of said hydraulic control valve (1000) and said outlet (420) of said hydraulic control valve (1000) is via said actuator (200), such that, if said actuator (200) is in its closed position, the fluid connection is blocked between the diaphragm space (650) of said hydraulic control valve (1000) and the outlet (420) of said hydraulic control valve (1000) so that water pressure behind said diaphragm (600) seals said diaphragm (600) against a barrier (450) between inlet (410) and outlet (420), preventing water flow from said inlet (410) to said outlet (420) and if said actuator (200) is in its open position there is a fluid connection enabling water to escape from behind said diaphragm (600) so that said diaphragm (600) unseals from said barrier (450) and water flows from said inlet (410) to said outlet (420), thereby providing automatic control of said liquid flow;
b. providing a hydraulic control valve (1000) adapted to contain said selector (500) snugly and rotatably;
c. seating said selector (500) snugly and rotatably in said hydraulic control valve (1000);
d. connecting said hydraulic control valve (1000) to a source of liquid;
e. connecting said solenoid (210) to at least one of said hydraulic control valve (1000) and said selector (500);
f. reversibly positioning said selector (500) in a position selected from a group consisting of said always-off position (1050), said always-on position (1040) and said automatic-control position (1030).

It is another object of the present invention to disclose the method, additionally comprising steps of providing a manual control means adapted to enable said selector to reversibly configure into a member selected from a group consisting of said always-off position (1050), said automatic position (1030), and said always-on position (1040).

It is another object of the present invention to disclose the method, additionally comprising a step of selecting said manual control means (550) from a group consisting of a lever, a knob, a button, a slider, and any combination thereof.

It is another object of the present invention to disclose the method, additionally comprising steps of characterizing said bore (540) by a main longitudinal axis.

It is another object of the present invention to disclose the method, additionally comprising a step of adapting said manual control means (550) to rotate said main section (560) about said bore (540) main longitudinal axis.

It is another object of the present invention to disclose the method, additionally comprising a step of adapting said selector (500) for outside-in flow.

It is another object of the present invention to disclose the method, additionally comprising at least one check mechanism, said check mechanism adapted to provide a positive indication that said selector is properly aligned to at least one of said at least one first position and said at least one second position.

It is another object of the present invention to disclose the method, wherein said check mechanism is selected from a group consisting of: a stop, a detent, a catch, a pawl, a dog, a pin, a stud, a lever, and any combination thereof.

It is another object of the present invention to disclose the method, additionally comprising a step of controlling flow of a liquid selected from a group consisting of water, oil, alcohol, milk, juice, tea, coffee and any combination thereof.

It is another object of the present invention to disclose a method for mechanically controlling flow in a hydraulic control valve (1000) controllable by an actuator (200) comprising a plunger (210), said actuator (200) having a first state with said plunger (210) in a blocking position preventing flow of fluid past the tip of said plunger (210), and a second state with said plunger (210) in an unblocking position permitting flow of fluid past the tip of said plunger (210), said hydraulic control valve (1000) having a diaphragm space (650) between said hydraulic control valve's diaphragm (600) and said hydraulic control valve's cover (300), said hydraulic control valve (1000) further having a wall hole (430) such that said diaphragm space (650) is fluidly connectable via a selector (500) to said outlet (420); comprising steps of:

a. providing said selector (500) comprising:
   i. a main section (560) fitting snugly and rotatably into said hydraulic control valve (1000), said main section (560) comprising:
      a. a central bore (540) comprising, at its upstream end, a nozzle gate (542) and, at its downstream end, an exit nozzle (544), said central bore (540) adapted to be reversibly sealable at said nozzle gate (542) by said plunger (210), said central bore (540) fluidly connected at said exit nozzle (544) to said outlet (420);
      b. a well (530) at least partly surrounding said central bore (540), said well (530) fluidly connected to said nozzle gate (542);
      c. a first aperture (510) adapted to fluidly connect said wall hole (430) to said well (530); and
      d. a second aperture (520) adapted to fluidly connect said wall hole (430) to a side of said bore (540), said second aperture (520) fluidly connected to said well only via said nozzle gate (542), said first aperture (510) being blocked by said hydraulic control valve (1000) at such times as said second aperture (520) is fluidly connected to said wall hole (430) and said second aperture (510) being blocked by said hydraulic control valve (1000) at such times as said first aperture (520) is fluidly connected to said wall hole (430); and
   ii. a manual control means (550) connected to said main section (560), said manual control means (550) adapted to enable said main section (560) to configure into at least three positions, an automatic position (1030) such that said first aperture (510) is fluidly connected to said wall hole (430), an always-on position (1040) such that said second aperture (520) is fluidly connected to said wall hole (430), and an always-off position (1050) such that fluid connection to said wall hole (430) is blocked;
b. providing said hydraulic control valve (1000) adapted to contain said selector (500) snugly and rotatably, said hydraulic control valve (1000) automatically controllable by said actuator (200), said hydraulic control valve (1000) characterized by
   i. a body (400);
   ii. an inlet (410);
   iii. an outlet (420);
   iv. a barrier (450) partially blocking liquid flow between said inlet (410) and said outlet (420); and
   v. a diaphragm (600) separated from said body (400) by a diaphragm space (650); said diaphragm (600) having at least one diaphragm hole (610) fluidly connecting said inlet and said diaphragm space; and said body (400) having a wall hole (430) such that said diaphragm space (650) is fluidly connectable via said selector (500) to said outlet (420); said diaphragm (600) having at least two positions, a sealed position wherein said diaphragm (600) seals against said barrier (450) and prevents liquid flow from said inlet (410) to said outlet (420) and an unsealed position wherein there is a gap between said diaphragm (600) and said barrier (450), such that said inlet (410) is fluidly connected to said outlet (420) via said gap; and said diaphragm (600) being in said sealed position at such times as liquid flow is prevented between said diaphragm space (650) and said outlet (420); and said diaphragm (600) being in said unsealed position at such times as there exists liquid flow between said diaphragm space (650) and said outlet (420);

c. seating said selector (500) snugly and rotatably in said hydraulic control valve (1000);
d. connecting said hydraulic control valve (1000) to a source of liquid;
e. connecting said actuator (200) to at least one of said hydraulic control valve (1000) and said selector (500);
f. reversibly positioning said selector (500) in a position selected from a group consisting of said always-off position (1050), said always-on position (1040) and said automatic-control position (1030)

thereby, at such times as said selector (500) is in said automatic position (1030), fluidly connecting said diaphragm space (650) to said outlet (420) via said nozzle gate (542) of said central bore (540) and controlling liquid flow by said state of said actuator (200);

further thereby, at such times as said selector (500) is in said always-on position (1040), fluidly connecting said diaphragm space (650) to said outlet (420) via said second aperture (520) and said side of said central bore (540) and providing liquid flow independent of said actuator (200);

and further thereby, at such times as said selector (500) is in said always-off position (1050), blocking fluid connection between said diaphragm space (650) and said central bore, and preventing liquid flow from said inlet (410) to said outlet (420).

It is another object of the present invention to disclose the method, additionally comprising steps of providing a manual control means adapted to enable said selector (500) to reversibly configure into a member selected from a group consisting of said always-off position (1050), said automatic position (1030), and said always-on position (1040).

It is another object of the present invention to disclose the method, additionally comprising a step of selecting said manual control means (550) from a group consisting of a lever, a knob, a button, a slider, and any combination thereof.

It is another object of the present invention to disclose the method, additionally comprising steps of characterizing said bore (540) by a main longitudinal axis.

It is another object of the present invention to disclose the method, additionally comprising a step of rotating said main section (560) about its main longitudinal axis by means of said manual control means (550).

It is another object of the present invention to disclose the method, additionally comprising a step of adapting said selector (500) for outside-in flow.

It is another object of the present invention to disclose the method, additionally comprising at least one check mechanism, said check mechanism adapted to provide a positive indication that said selector is properly aligned to at least one of said at least one first position and said at least one second position.

It is another object of the present invention to disclose the method, wherein said check mechanism is selected from a group consisting of: a stop, a detent, a catch, a pawl, a dog, a pin, a stud, a lever, and any combination thereof.

It is another object of the present invention to disclose the method, additionally comprising a step of controlling flow of a liquid selected from a group consisting of water, oil, alcohol, milk, juice, tea, coffee and any combination thereof.

BRIEF DESCRIPTION OF THE FIGURES

In order to better understand the invention and its implementation in practice, a plurality of embodiments will now be described, by way of non-limiting example only, with reference to the accompanying drawings, wherein.

DETAILED DESCRIPTION OF THE PREFERRED EMBODIMENTS

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for controlling flow of water in a watering system, with the flow normally controlled automatically but where the flow of water can be controlled manually in a rapid and efficient manner such that flow of water can be prevented, independent of the automatic control and flow of water can be ensured, independent of the automatic control.

The term 'automatic control' hereinafter refers to a configuration of the hydraulic control valve wherein liquid flow is controlled by operation of an automatic control mechanism, typically a solenoid comprising a plunger.

The term 'always on' hereinafter refers to a configuration of the hydraulic control valve wherein liquid flows through the valve independent of the automatic control system. In the always-on configuration, water flows through the hydraulic control valve even when the automatic control system is in its stop-flow configuration.

The term 'always off' hereinafter refers to a configuration of the hydraulic control valve wherein liquid flow is blocked, independent of the automatic control system. In the always-off configuration, water does not flow through the system, even if the automatic control system is in it allow-flow configuration.

The term 'outside-in' hereinafter refers to a liquid flow path in the region of the actuator that is from the outside to the inside, in this case, from the well (530) into the bore (540). In a device with inside-out flow, the flow would be from the diaphragm space (650) through the bore (540) to the well (530), and from thence into the outlet (420).

In the embodiments of a hydraulic control valve described herein, automatic control of fluid flow is via an electrically-operated control mechanism such as a solenoid, so that the valve can be more fully described as a hydraulic-electric control valve. There also exist valves to control fluid flow wherein the control mechanism is itself hydraulic; valves of this type, which can be described as hydraulic-hydraulic control valves, are not disclosed herein.

Figure 1:
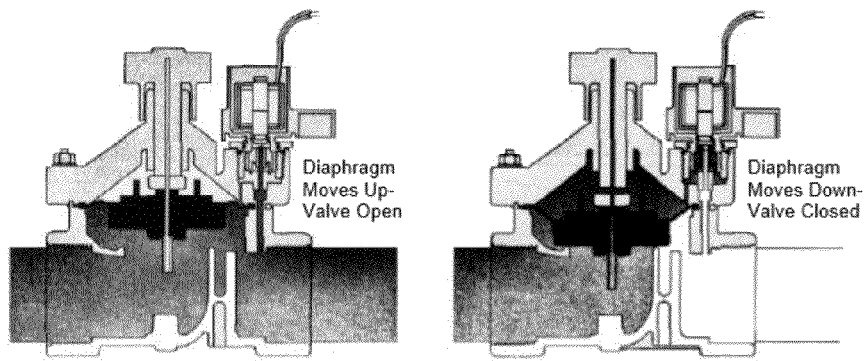
FIG. 1A-C depicts examples of the prior art.
Figure 1:
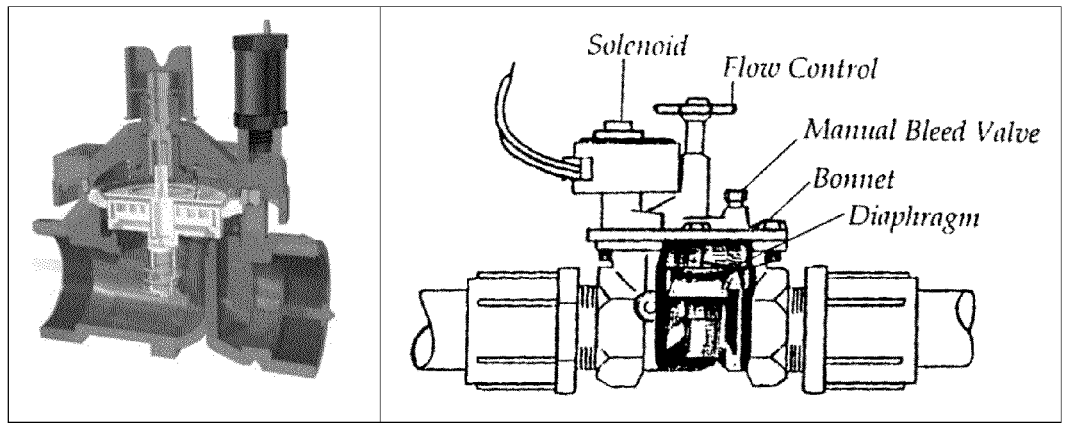

FIG. 1 shows examples of typical hydraulic control valves of the prior art. FIG. 1A shows a typical automatic hydraulic control valve lacking a manual shutoff. When the diaphragm is in its upper position (left), the valve is open and water flows from left to right, over the barrier, and through the valve. When the diaphragm is in its lower position (right), the barrier blocks the flow and water is present only in the left side of the valve. FIG. 1B functions in a manner similar to FIG. 1A and also lacks a manual shutoff. FIG. 1C includes a manual flow control. However, the manual flow control puts the device in the automatic configuration, rather than preventing flow at all times. In all three examples of the prior art, the solenoid must be used to stop the flow of liquid through the valve.

In prior-art valves with a manual control, the manual control is a separate handle (sometimes a screw) in addition to the automatic on/off control on the valve. The manual control bypasses the automatic valve features allowing the valve to be closed in an emergency by turning a handle just like a standard manual valve. Therefore, although the manual control allows stopping flow independently of the automatic on/off control, the manual control does not have an "always on" feature; it is not possible to have flow which is independent of the automatic on/off control.

Table 1A shows the effect on fluid flow of the automatic and manual settings of typical prior-art devices, while Table 1B shows the effect on fluid flow of the device disclosed in U.S. Pat. No. 3,500,844.

TABLE 1A

Effect on fluid flow of the settings of the automatic and manual controls for typical prior-art devices.

| | Automatic Control Setting | |
|---|---|---|
| Manual Control Setting | Blocking (Off) | Not Blocking (On) |
| Off | No flow | Flow |
| On | Flow | Flow |

TABLE 1B

Effect on fluid flow of the settings of the automatic and manual controls for the device disclosed in U. S. Pat. U.S. 3,500,844.

| | Automatic Control Setting | |
|---|---|---|
| Manual Control Setting | Blocking (Off) | Not Blocking (On) |
| Off | No flow | No flow |
| On | No flow | Flow |

In all the figures below, similar numbers refers to similar parts.

Figure 2:
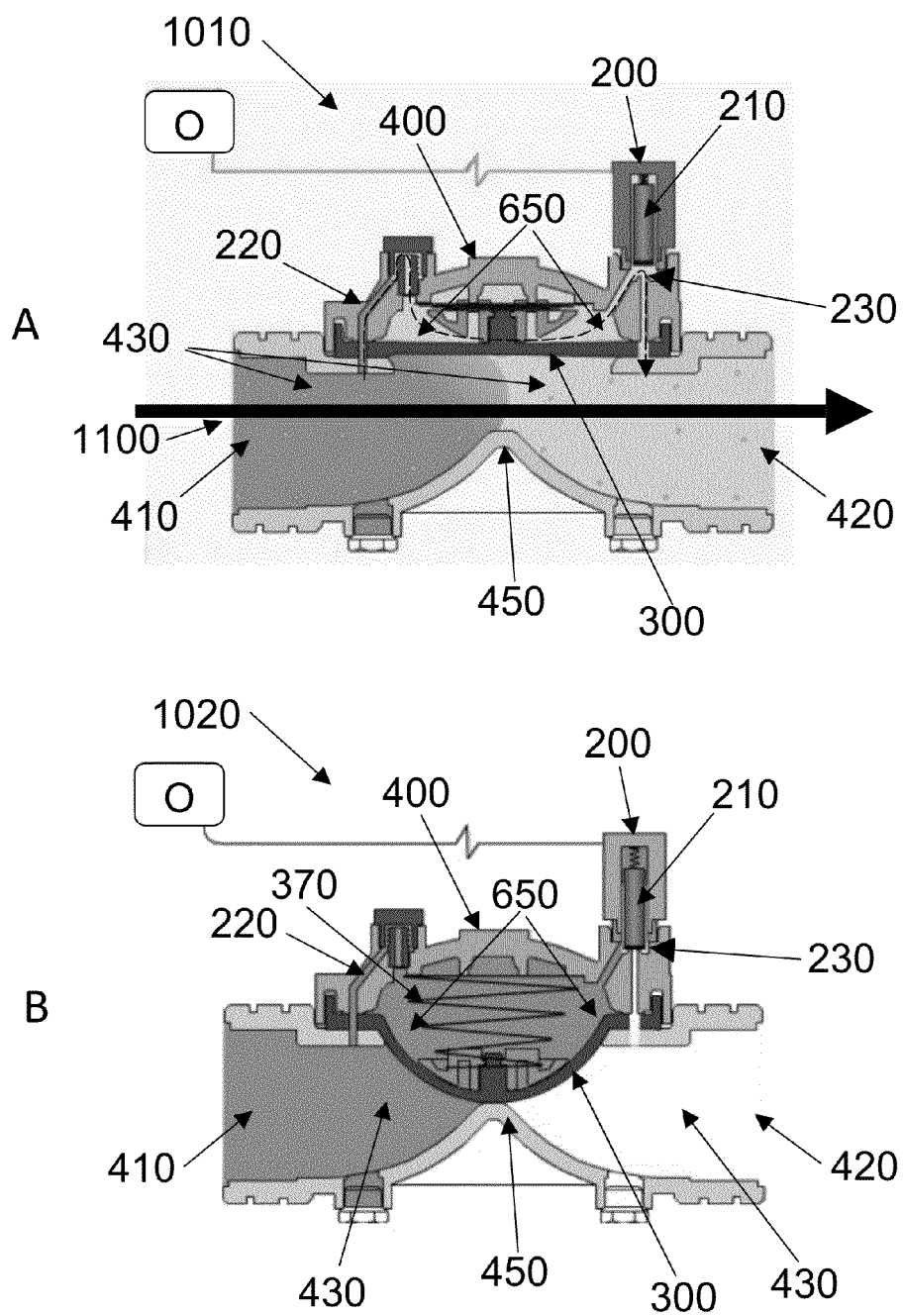
FIG. 2A-B schematically illustrates the method by which water flow is controlled in typical hydraulic control valves.

FIG. 2 shows a schematic of a hydraulic control valve in which the mechanism of operation is more clearly visible than in FIG. 1. FIG. 2A shows the valve in its open configuration, while FIG. 2B shows it in its closed configuration. Flow control in hydraulic control valves is via an actuator (200), which is typically a solenoid. Other actuators include pneumatic actuators and electric motors. All actuators for automatic shutoff valves of this type function by blocking or unblocking a small aperture and thereby permitting or preventing flow of fluid from the space between the diaphragm and the cover.

Solenoids comprise a plunger (210) with at least two states. When the plunger (210) is in a first state, it is refracted into the body of the solenoid (200, FIG. 2A); in a second state, the plunger (210) extends from the body of the solenoid (200, FIG. 2B). In typical solenoid-controlled valves, as shown in this example, the valve is "open" and liquid flows when the solenoid is in the first state and "closed", without liquid flow, when the solenoid is in the second state. Any automatically-controllable mechanism known in the art that has at least two states, one adapted to block liquid flow through an opening and one adapted to allow liquid flow through the same opening can be used.

In the exemplary solenoid-controlled hydraulic control valve in its "on" configuration shown in FIG. 2A, the solenoid (200) is ON, which has retracted the plunger (210) into the body of the solenoid (200). This opens the outlet-side channel (230), allowing liquid flow (dotted arrow) from the inlet (410) to the outlet (420) via the inlet-side channel (220), the diaphragm space (650) between the diaphragm (300) and the body (400) of the hydraulic control valve (1000), and the outlet channel (230). As the diaphragm (300) is moved upward by water pressure, water is forced out of the diaphragm space (650), lowering the pressure in the diaphragm space and allowing the diaphragm (600) to rise against the force of the return spring (not shown). If the pressure in the main channel (430) drops, the diaphragm (600) lowers, and water refills the diaphragm space (650) via the inlet-side channel (220). In this example, water flow (1100, heavy arrow) is from left to right; the darker area on the left is water under the higher inlet pressure; the lighter area on the right is water under the lower outlet pressure. The barrier (450) provides only a small restriction to the flow when the valve is open.

In FIG. 2B, the exemplary solenoid-controlled hydraulic control valve is off; the solenoid is in its "OFF" state, with the plunger (210) extended from the body of the solenoid (200). This closes the outlet-side channel (230), preventing liquid flow through the outlet-side channel (230). Liquid flowing into the diaphragm space (650) via the inlet side channel (220) will cause pressure to build up in the diaphragm space (650), allowing the return spring (370) to force the diaphragm (600) down onto the barrier (450), sealing the main channel (420) and preventing liquid flow through the main channel (430).

The device of the present invention comprises an outside-in type valve for controlling liquid flow, especially water flow. The device is intended for use in systems where automatic control of flow is desired, but where a manual override is desirable. The automatic control system is typically via a solenoid, although other automatic control systems can be used. The manual override has three positions—closed, wherein no liquid flows through the valve no matter what the position of the solenoid; always on, wherein liquid flows through the valve no matter what the position of the solenoid; and automatic, wherein the flow of liquid is regulated by the solenoid. Table 2 shows the effect on fluid flow of the automatic and manual settings of the present device.

TABLE 2

Effect on fluid flow of the settings of the automatic and manual controls for the present device.

| Manual Control Setting | Automatic Control Setting | |
| --- | --- | --- |
|  | Blocking (Off) | Not Blocking (On) |
| Off | No flow | No flow |
| On | Flow | Flow |
| Automatic | No flow | Flow |

In the present device, rotation of a portion of the valve, as described herein below, effects the change in action of the valve, altering the action from any one of always off, automatic, and always on to any of the others, as shown in Table 2. In preferred embodiments of the device, the rotation is effected by pressure on a manual control means (550), where the manual control means (550) is a protrusion on the side of the main section (560) of the selector (500)

Figure 3:
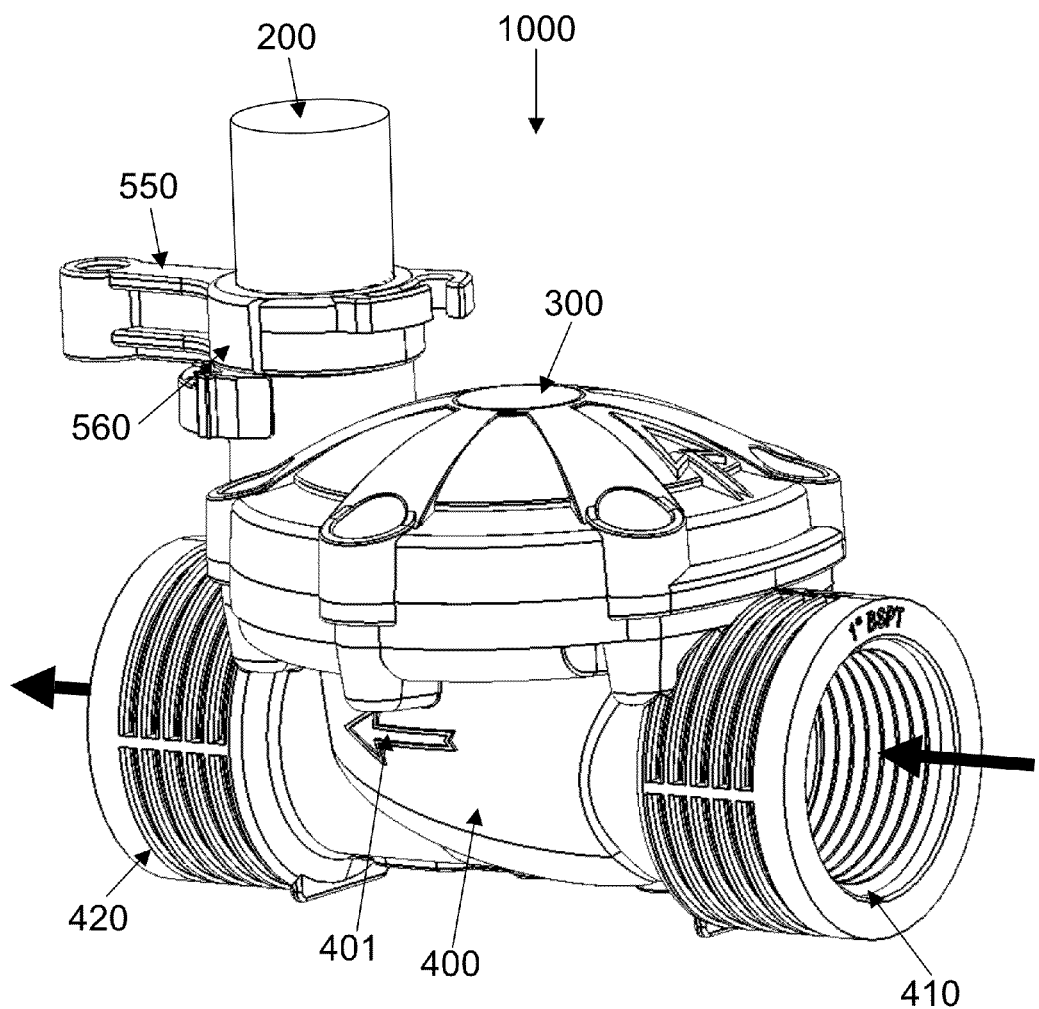
FIG. 3 illustrates the exterior of an embodiment of the hydraulic control valve of the present invention.

In reference to FIG. 3, a view is shown of the exterior of an embodiment of the valve of the present invention (1000). The valve (1000) comprises a body (400) with inlet (410) and outlet (420). The direction of water flow is from inlet (410) to outlet (420), as shown by the heavy arrows and, representationally, by the outlined arrow (401) on the body (400). The device further comprises a cover (300) and a manual control means (550). In use, an actuator (200), typically a solenoid, is attached to the device to automatically control water flow; the device can be supplied without solenoid and the user can supply one.

Figure 4:
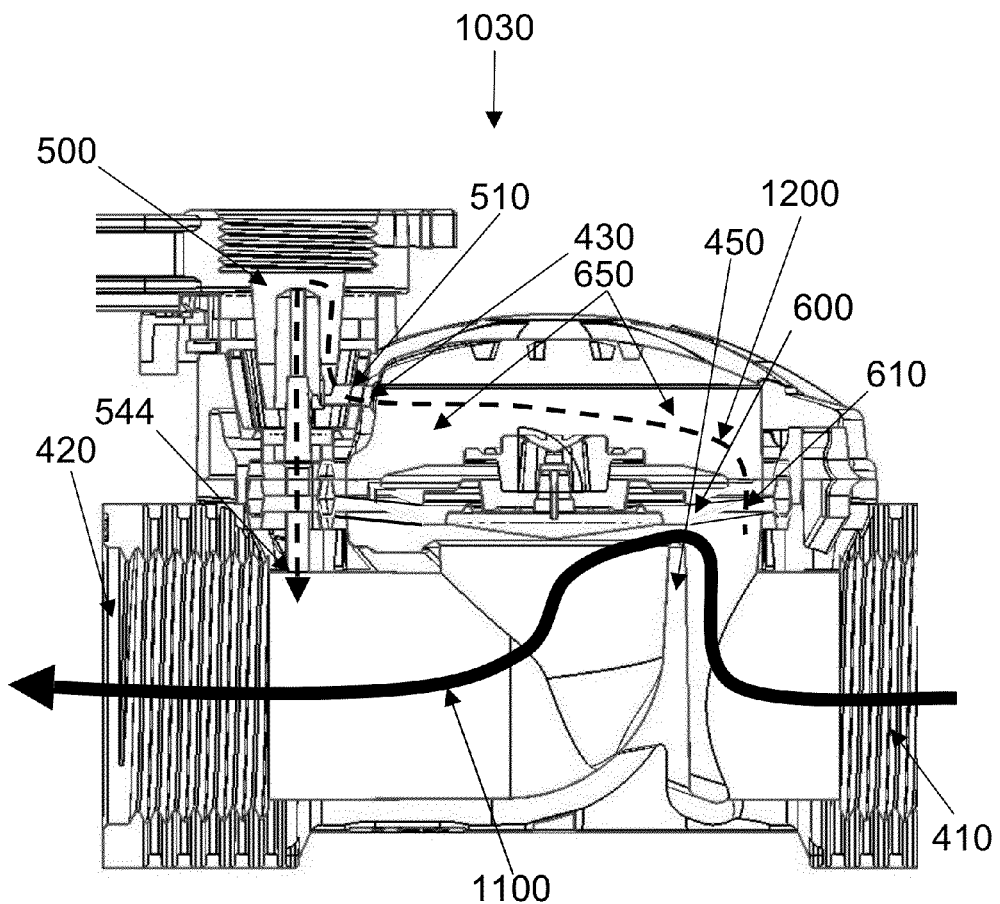
FIG. 4 illustrates liquid flow through a cross-section of an embodiment of the hydraulic control valve of the present invention in the automatic-control position.

In reference to FIG. 4, a cross-section of the device is shown in the automatic-control position (1030), with the diaphragm (600) lifted so that liquid can flow through the valve. The actuator (200) is not shown.

The diaphragm (600) is in a raised position; liquid flows (1100) from the inlet (410), over the edge of the barrier (450), and through the outlet (420).

The diaphragm (600) has a small hole in it (610); the hole can be at any convenient position and need not be at the location indicated conceptually in FIG. 4. The hole (610) enables water to pass into the diaphragm space (650) between the diaphragm (600) and the cover (300) and keeps the diaphragm space (650) filled with water.

The body (400) has a second hole (430) which is blockable by the selector (500).

If the body hole (430) is blocked by the selector (500), then liquid can not flow of the diaphragm space (650), pressure behind the diaphragm (600) rises, and the diaphragm (600) seals against the barrier (450), blocking flow from inlet (410) to outlet (420).

If the body hole (430) is fluidly connected to the outlet (420), via the selector (500), then liquid flows out of the diaphragm space (650), pressure behind the diaphragm (600) reduces, and the diaphragm (600) rises, allowing the main flow of liquid (1100).

When the device is in the automatic position, the body hole (430) is fluidly connected to the automatic operation hole (510) in the selector (500) for the solenoid. This hole connects the diaphragm space (650) with a well (530) in the selector (500), the well (530) being fluidly connected with the nozzle gate (542) of the bore (540) of the selector (500), with the bottom end (544) of the bore (540) being fluidly connected to the outlet (420).

If there is a gap between the plunger (210, not shown) and the nozzle gate (542) of the bore (540), liquid flows (1200, dotted arrow) from the diaphragm space (650) to the outlet (420) via the body hole (430), the automatic operation hole (510), the well (530) and the bore (540), thereby, as described above, causing the diaphragm to rise and allowing flow (1100) between inlet (410) and outlet (420).

If the plunger (210, not shown) is in contact with the nozzle gate (542) of the bore (540), it blocks liquid flow from the diaphragm space (650) to the outlet (420), thereby, as described above, causing the diaphragm to lower and stopping flow (1100) between inlet (410) and outlet (420).

In the embodiment shown of the device of the present invention, the flow is outside-in, such that the liquid flow path in the region of the actuator is from the outside to the inside, in this case, from the well (530) into the bore (540). In a device with inside-out flow, the flow would be from the diaphragm space (650) through the bore (540) to the well (530), and from thence into the outlet (420).

Figure 5:
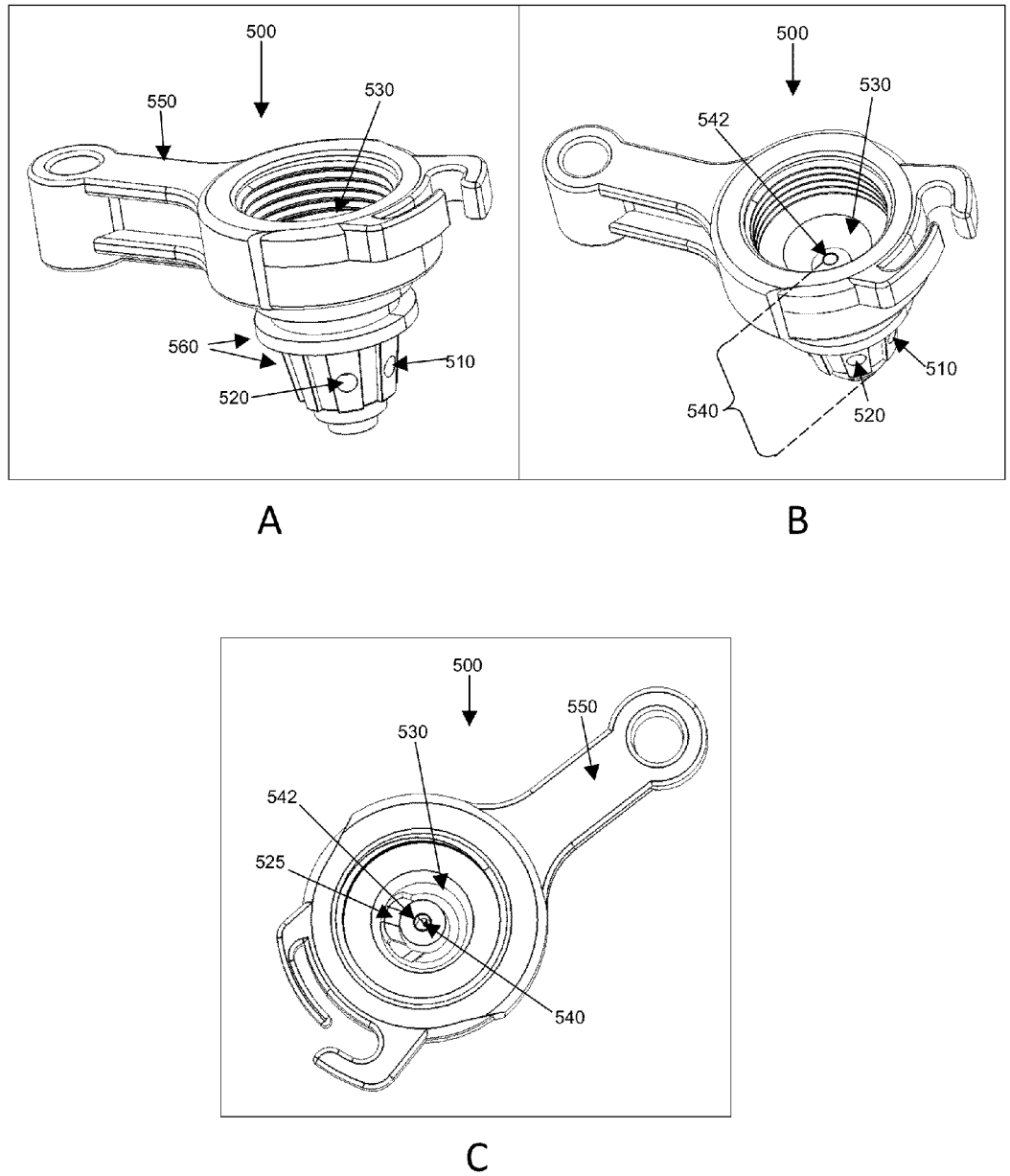
FIG. 5A-C illustrates an embodiment of the selector of the present invention.

The selector (500) is shown in FIG. 5A-C. FIG. 5A shows the selector (500) from the side, showing the main section (560) and the manual control means (550), in this embodiment, a lever.

In other embodiments, the manual control means (550) can be a knob, a button, a slider, or any other means known in the art for mechanically rotating the main section (560) about its main longitudinal axis, which is typically parallel to the bore (540) of the selector (500).

The main section (560) comprises two liquid connection holes (510, 520). The automatic operation hole (510) fluidly connects the diaphragm space (650) to the outlet (420) via the interior (530) of the main section (560), and the always-on hole (520) provides a fluid connection between the diaphragm space (650) and the outlet (420) which bypasses the interior (530) of the main section (560).

FIG. 5B shows the selector (500) from an angle such that the interior (530) can be seen. In use, in its closed position, the solenoid (200, not shown) blocks the nozzle gate (542) of the bore (540) of the selector (500). Therefore, in the solenoid's (200) closed position, the diaphragm space (650) has no fluid connection to the outlet (420) and no liquid flows. In use, in the solenoid's (200, not shown) open position, the solenoid (200) does not block the bore (540), so that there can be a fluid connection between the diaphragm space (650) and the outlet (420) via the interior (530) of the base unit and the bore (540). That fluid connection is effectuated by the automatic operation hole (510); the water flows from the diaphragm space (650) via the body hole (430, not shown) and the automatic operation hole (510) to the interior (530) of the main section (560), through the bore's nozzle gate (542) into the bore (540) and from thence into the outlet (420, not shown), as shown by the dashed line (1200) in FIG. 4.

FIG. 5C shows the selector (500) from an angle such that the tubule (525) providing fluid connection between the diaphragm space (650) and the outlet (420) in the 'always on' setting can be seen. The always-on hole (520, not shown) is connected to the bore (540) via the tubule (525). Typically, the tubule (525) is in the lower half of the main section (560). In the always-on position, the liquid never enters the interior (530) of the base unit; it flows directly from the diaphragm space (650, not shown) through the always-on hole (520, not shown) and the tubule (525) to the bore (540). The liquid enters the bore (540) from the side, typically in the lower half of the bore (540), and from thence passes to the outlet (420), bypassing completely the nozzle gate of the bore (542) and the automatic control unit contactable thereunto.

Figure 6:
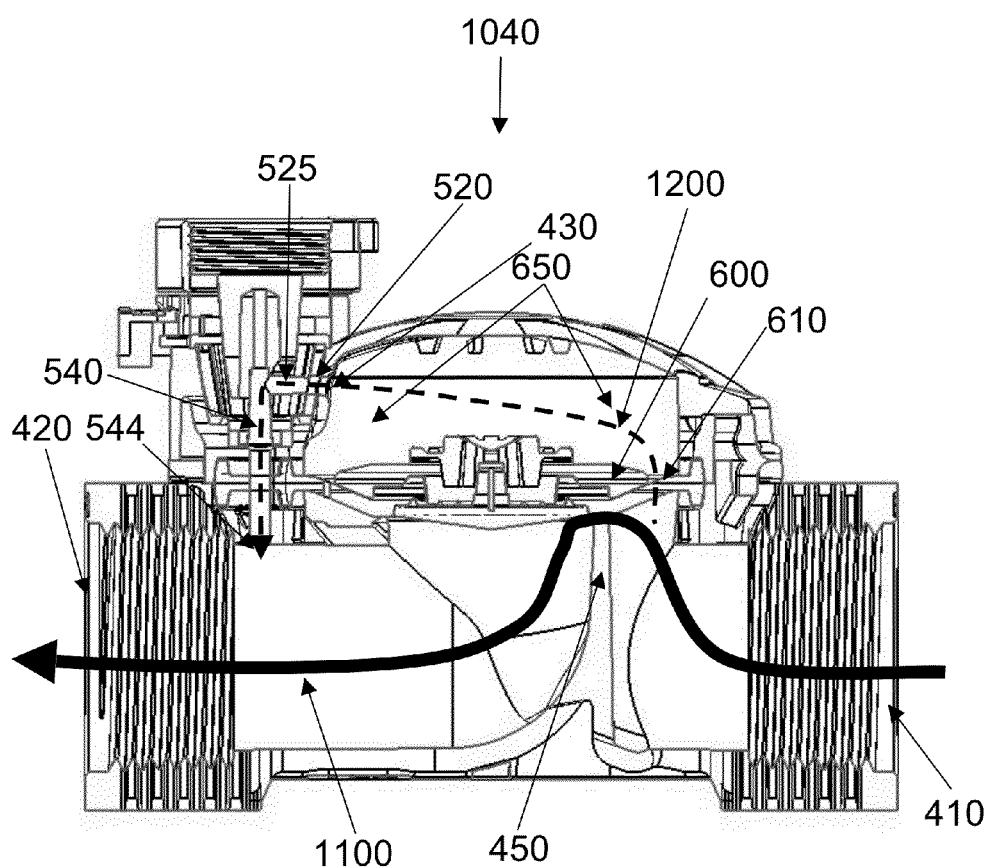
FIG. 6 illustrates liquid flow through a cross-section of an embodiment of the hydraulic control valve of the present invention in the always-on position.

FIG. 6 schematically illustrates the direction of liquid flow when the selector (500) is in the always-on position (1040). The heavy arrow (1100) shows the main liquid flow and the dashed line (1200), the direction of flow for allowing pressure reduction and opening of the diaphragm (600). The main flow, as before, is from the inlet (410), over the barrier (450), and through the outlet (420). The pressure reduction flow (1200) passes through the diaphragm hole (610, not shown), through the diaphragm space (650), and, via the body hole (430), the always-on hole (520), and the tubule (525), to the lower part of the bore (540), and, via the bottom end (544) of the bore into the outlet (420).

Figure 7:
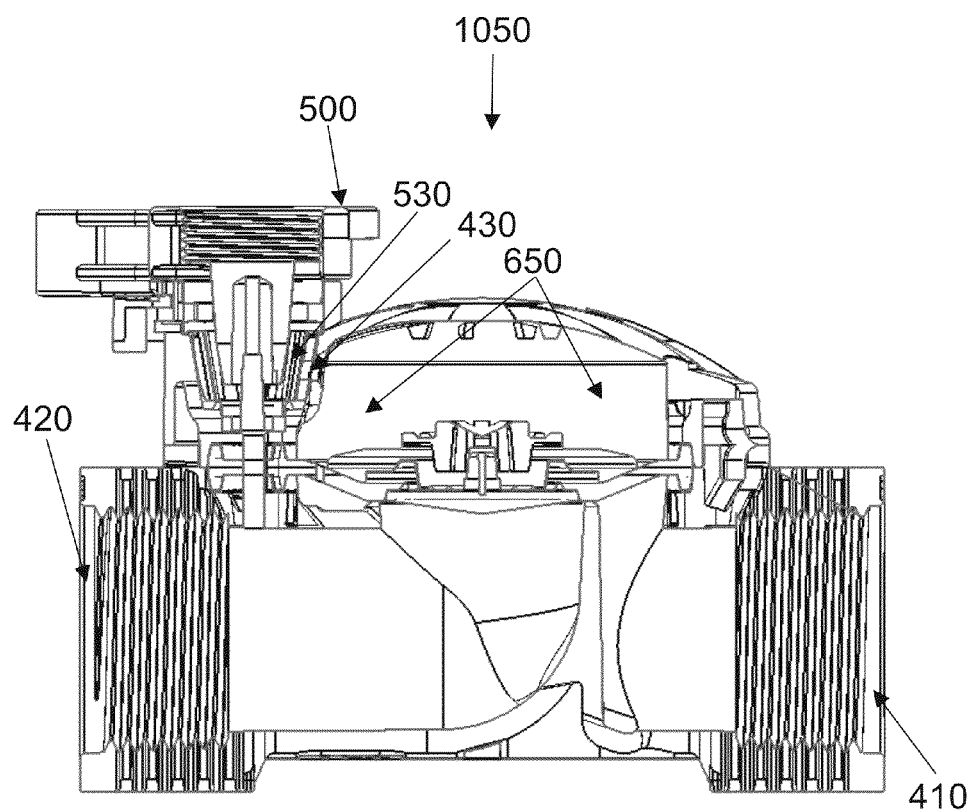
FIG. 7 illustrates liquid flow through a cross-section of an embodiment of the hydraulic control valve of the present invention in the always-off position.

FIG. 7 schematically illustrates the always-off configuration (1050). In the always-off configuration, the selector (500) blocks (530) the body hole (430), thereby preventing liquid flow from the diaphragm space (650) to the outlet (420), thereby, as described above, keeping the diaphragm (600) sealed against the barrier (450) and preventing liquid flow from the inlet (410) to the outlet (420).

In some embodiments, the selector comprises at least one, and preferably three, check mechanisms. The check mechanism provides a positive indication that the selector is properly aligned to at least one position (always-on, always-off and automatic). A check mechanism can comprise any means known in the art, such as a stop, a detent, a catch, a pawl, a dog, a pin, a stud, a lever, and any combination thereof.

The valve of the present invention is typically used to control flow of water, for example, in sprinkler or irrigation systems. It can also be used to control flow of any liquid of low viscosity, for example, oil, alcohol, milk, juice, tea, coffee, and any mixture of these with water.

Table 3 comprises, for reference, a list of the numbers used herein and the portion of the device or the function of the device to which they refer.

TABLE 3

A list of the numbers used herein and the portion of the device or the function of the device to which they refer.

| | | | |
|---|---|---|---|
| 1000 | | | Hydraulic control valve |
| | 200 | | Actuator |
| | | 210 | Plunger |
| | | 220 | Inlet-side channel |
| | | 230 | Outlet-side channel |
| | 300 | | Cover |
| | | 370 | Return spring |
| | 400 | | Body |
| | | 401 | Flow direction indicator |
| | | 410 | Inlet |
| | | 420 | Outlet |
| | | 430 | Wall hole |
| | | 450 | Barrier |
| | 500 | | Selector |
| | | 510 | First aperture to connect wall hole to well |
| | | 520 | Second aperture to connect wall hole to bore |
| | | 525 | Tubule connecting second aperture to bore |
| | | 530 | Well |
| | | 540 | Bore |
| | | 542 | Nozzle gate |
| | | 544 | Nozzle exit |
| | | 550 | Manual control means |
| | | 560 | Selector main section |
| | 600 | | Diaphragm |
| | | 610 | Diaphragm space |
| | | 650 | Diaphragm hole |
| 1100 | | | Main fluid flow path |
| 1200 | | | Control fluid flow path |

The invention claimed is:

1. A selector (500) useful for controlling flow of fluid in a hydraulic control valve (1000), said flow of fluid controllable by an actuator (200) comprising a plunger (210), said actuator (200) having at least two states, a first state with said plunger (210) in a blocking position preventing flow of fluid past the tip of said plunger (210), and a second state with said plunger (210) in an unblocking position permitting flow of fluid past the tip of said plunger (210), said selector (500) comprising:
   a. a bore (540) characterized by a nozzle gate (542), said bore (540) blockable at said nozzle gate (542) by said plunger (210); and
   b. a manual control means (550) adapted to reversibly transition said selector (500) between at least two positions, a first at least one position (1030), and a second at least one position (1040, 1050) in which fluid flow bypasses said plunger (210) tip, enabling manual control of said fluid flow,
   wherein said hydraulic control valve (1000) is adapted to provide, in said at least one first position, fully-automatic control (1030) by enabling fluid flow past said tip of said plunger (210) so that said states of said actuator (200) control fluid flow and, in said at least one second position, fully-manual control of water flow by either (a) blocking fluid flow through said selector (1050), thereby preventing fluid flow through said valve or (b) providing a fluid connection through said selector (1040) wherein fluid flow is via a fluid connection (520, 525) bypassing said nozzle gate (542) of said bore (540), thereby enabling fluid flow through said hydraulic control valve (1000) independent of the position of said plunger (210), and wherein said bore (540) is characterized by a main longitudinal axis and said manual control means (550) is adapted to rotate said selector (500) about said bore (540) main longitudinal axis.

2. The selector (500) of claim 1, wherein said position (1050) in which fluid flow through said selector is blocked is an always-off position and said position (1040) in which fluid flow is via a fluid connection (520, 525) bypassing said nozzle gate (542) of said bore (540) is an always-on position.

3. The selector of claim 1, wherein said manual control means (550) is selected from a group consisting of a lever, a knob, a button, a slider, and any combination thereof.

4. The selector of claim 1, wherein said selector (500) is adapted for outside-in flow.

5. The selector of claim 1, additionally comprising at least one check mechanism, said check mechanism adapted to provide a positive indication that said selector is properly aligned to at least one of said at least one first position and said at least one second position, said check mechanism selected from a group consisting of: a stop, a detent, a catch, a pawl, a dog, a pin, a stud, a lever, and any combination thereof.

6. The selector of claim 1, wherein said hydraulic control valve is adapted to control flow of a liquid selected from a group consisting of water, oil, alcohol, milk, juice, tea, coffee and any combination thereof.

7. In a hydraulic control valve controllable by an actuator (200), a selector (500);

with said hydraulic control valve characterized by:
a. an off configuration (1020) such that fluid connection (220) is blocked between a diaphragm space (650) of said hydraulic control valve and outlet of said hydraulic control valve (420) so that water pressure behind a diaphragm (600) seals said diaphragm (600) against a barrier (450) between inlet (410) and said outlet (420), preventing water flow from said inlet to said outlet; and an on configuration (1010) such that there exists a fluid connection (220) between said diaphragm space (650) of said hydraulic control valve and outlet (420) of said hydraulic control valve, said fluid connection (220) enabling water to escape from behind said diaphragm (300) so that said diaphragm (600) unseals from said barrier (450) and water flows from said inlet (410) to said outlet (420);

b.

with said selector (500) adapted to reversibly configure into at least three positions:
a. an always-off position (1050) wherein said selector (500) blocks (530) fluid connection between said diaphragm space (650) and said outlet (420) so that said hydraulic control valve is in said off configuration independent of said actuator (200);

b. an always-on position (1040) wherein said selector (500) provides a fluid connection (520, 525) between said diaphragm space (650) and said outlet (420), said fluid connection (525) bypassing said actuator (200) so that said hydraulic control valve is in said on configuration independent of said actuator (200); and c. an automatic-control position (1030) wherein said selector (500) provides a fluid connection (510, 530) between said diaphragm space (650) and said outlet (420) via said actuator (200) so that said actuator (200) controls whether said hydraulic control valve is in said off configuration or said on configuration; and said selector (500) comprising:
a. a manual control means (550) adapted to enable said selector (500) to reversibly configure into a member selected from a group consisting of said always-off position (1050), said automatic-control position (1030), and said always-on position (1040); and
b. a bore (540) characterized by a nozzle gate (542) and a main longitudinal axis, said bore (540) blockable at said nozzle gate (542) by said actuator (200),
wherein said manual control means (550) is adapted to rotate said selector (500) about said bore (540) main longitudinal axis.

8. The selector of claim 7,
wherein said control means (550) is selected from a group consisting of a lever, a knob, a button, a slider, and any combination thereof.

9. The selector of claim 7, wherein said selector (500) is adapted for outside-in flow.

10. The selector of claim 7, additionally comprising at least one check mechanism, said check mechanism adapted to provide a positive indication that said selector is properly aligned to at least one of said at least one first position and said at least one second position, said check mechanism selected from a group consisting of: a stop, a detent, a catch, a pawl, a dog, a pin, a stud, a lever, and any combination thereof.

11. The selector of claim 7, wherein said hydraulic control valve is adapted to control flow of a liquid selected from a group consisting of water, oil, alcohol, milk, juice, tea, coffee and any combination thereof.

12. A method for providing control of flow of fluid in a hydraulic control valve (1000), said flow of fluid controllable by an actuator (200) comprising a plunger (210), said actuator (200) having at least two states, a first state with said plunger (210) in a blocking position preventing flow of fluid past the tip of said plunger (210), and a second state with said plunger (210) in an unblocking position permitting flow of fluid past the tip of said plunger (210), said method comprising steps of:

a. providing said hydraulic control valve (1000);
b. providing a selector (500) useful for controlling flow of fluid in said hydraulic control valve (1000), comprising:
    i. a bore (540) characterized by a nozzle gate (542), said nozzle gate (542) blockable by said plunger (210); and
    ii. a manual control means (550) adapted to reversibly transition said selector (500) between at least two positions, a first at least one position (1030), and a second at least one position (1040, 1050) in which fluid flow bypasses said plunger (210) tip, enabling manual control of said fluid flow;
c. emplacing said selector (500) in said hydraulic control valve (1000); and
d. positioning said manual control means (550) in a position selected from a group consisting of said at least one first position and said at least one second position thereby, in said at least one first position, controlling said fluid flow in a fully-automatic manner by enabling fluid flow past said tip of said plunger (210) so that said states of said actuator (200) control fluid flow and, in said at least one second position, controlling said fluid flow in a fully-manual manner by either (a) blocking fluid flow through said selector (1050), thereby preventing fluid flow through said hydraulic control valve (1000) or (b) providing a fluid connection through said selector (1040) wherein fluid flow is via a fluid connection (520, 525) bypassing said nozzle gate (542) of said bore (540), thereby enabling fluid flow through said hydraulic control valve (1000) independent of the state of said actuator (200), and wherein said bore (540) is characterized by a main longitudinal axis and said manual control means (550) is adapted to rotate said selector (500) about said bore (540) main longitudinal axis.

13. The method of claim 12, additionally comprising steps of providing (i) an always-off position, said always-off position being said position (1050) wherein fluid flow through said selector is blocked and (ii) an always-on position, said always-on position being said position (1040) wherein fluid flow is via a fluid connection (520, 525) bypassing said nozzle gate (542) of said bore (540).

14. The method of claim 12, additionally comprising steps of selecting said manual control means (550) from a group consisting of a lever, a knob, a button, a slider, and any combination thereof.

15. The method of claim 12, additionally comprising steps of providing said selector (500) adapted for outside-in flow.

16. The method of claim 12, additionally comprising steps of (i) providing at least one check mechanism, said check mechanism adapted to provide a positive indication that said selector is properly aligned to at least one of said at least one first position and said at least one second position, and (ii) selecting said check mechanism from a group consisting of: a stop, a detent, a catch, a pawl, a dog, a pin, a stud, a lever, and any combination thereof.

17. The method of claim 12, additionally comprising steps of controlling flow of a liquid selected from a group consisting of water, oil, alcohol, milk, juice, tea, coffee and any combination thereof.

* * * * *